(12) United States Patent
Callison et al.

(10) Patent No.: US 11,372,463 B1
(45) Date of Patent: Jun. 28, 2022

(54) POWER DOWN OF POWER OVER ETHERNET INTERFACES

(71) Applicant: HEWLETT PACKARD ENTERPRISE DEVELOPMENT LP, Houston, TX (US)

(72) Inventors: Rachel Callison, Roseville, CA (US); Tsun-Yao Chang, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/179,638

(22) Filed: Feb. 19, 2021

(51) Int. Cl.
  *G06F 1/3206* (2019.01)
  *G06F 1/26* (2006.01)

(52) U.S. Cl.
  CPC ............ *G06F 1/266* (2013.01); *G06F 1/3206* (2013.01)

(58) Field of Classification Search
  CPC ............................... G06F 1/266; G06F 1/3206
  See application file for complete search history.

(56) References Cited

U.S. PATENT DOCUMENTS

| | | | |
|---|---|---|---|
| 7,356,588 B2 | 4/2008 | Stineman, Jr. et al. | |
| 7,640,467 B2 | 12/2009 | Sumimoto | |
| 9,110,972 B2 | 8/2015 | Hamdi et al. | |
| 9,667,429 B2 | 5/2017 | Dwelley et al. | |
| 9,967,104 B2 | 5/2018 | Gardner et al. | |
| 10,069,636 B2 | 9/2018 | Yseboodt et al. | |
| 2006/0259792 A1* | 11/2006 | Dove .................... | G06F 1/266 713/300 |
| 2009/0083552 A1* | 3/2009 | Hussain ................ | H04L 12/10 713/300 |
| 2010/0106985 A1* | 4/2010 | Panguluri ............. | G06F 1/266 713/300 |
| 2019/0064890 A1 | 2/2019 | Donachy et al. | |
| 2019/0227608 A1 | 7/2019 | Chen et al. | |
| 2019/0278347 A1 | 9/2019 | Goergen et al. | |
| 2019/0312751 A1 | 10/2019 | Goergen et al. | |

* cited by examiner

*Primary Examiner* — Gary Collins
(74) *Attorney, Agent, or Firm* — Hewlett Packard Enterprise Patent Department

(57) ABSTRACT

Examples described herein provide improved power down of PoE interfaces. Examples described herein may set a power fault value for each of a plurality of PSUs, and set a power threshold value for each of a plurality of PoE interfaces. Examples described herein may detect a fault that interrupts a flow of power from a subset of the PSUs to at least one of the PoE interfaces, and based on detecting the fault, for each PSU in the subset of the PSUs, add the power fault value for the PSU to a total power fault value. Examples described herein may, for each of the PoE interfaces, determine whether the total power fault value satisfies the power threshold value for the PoE interface, and based on a determination that the total power fault value satisfies the power threshold value for the PoE interface, power down the PoE interface.

20 Claims, 5 Drawing Sheets

POWER DOWN OF POWER OVER ETHERNET INTERFACES

BACKGROUND

Power over Ethernet (PoE) allows an Ethernet cable to be used for both power transmission and data transmission. Devices such as Voice over Internet Protocol (VoIP) phones, Light-Emitting Diode (LED) lights, Internet Protocol (IP) cameras, wireless access points (APs), and Bluetooth Low-Energy (BLE) beacons can be powered by PoE and can therefore be installed in locations where it would be impractical or expensive to install conventional wires used to provide power.

A number of industry standards exist for PoE devices. For example, the Institute of Electrical and Electronics Engineers (IEEE) has defined at least three industry standards: IEEE 802.3af, which allows up to 15.4 Watts to be delivered over Category 5 (Cat5) Ethernet cables; IEEE 802.3at, which allows up to 30 Watts to be delivered over Cat5 cables; and IEEE 802.3bt, which allows up to 71.3 Watts to be delivered over Cat5 cables. LTPoE++, a proprietary standard, allows up to 90 Watts to be delivered over Cat5 cables. In the IEEE standards, a device that receives PoE is called a Powered Device (PD), while a device that provides PoE is called a Power Sourcing Equipment (PSE).

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
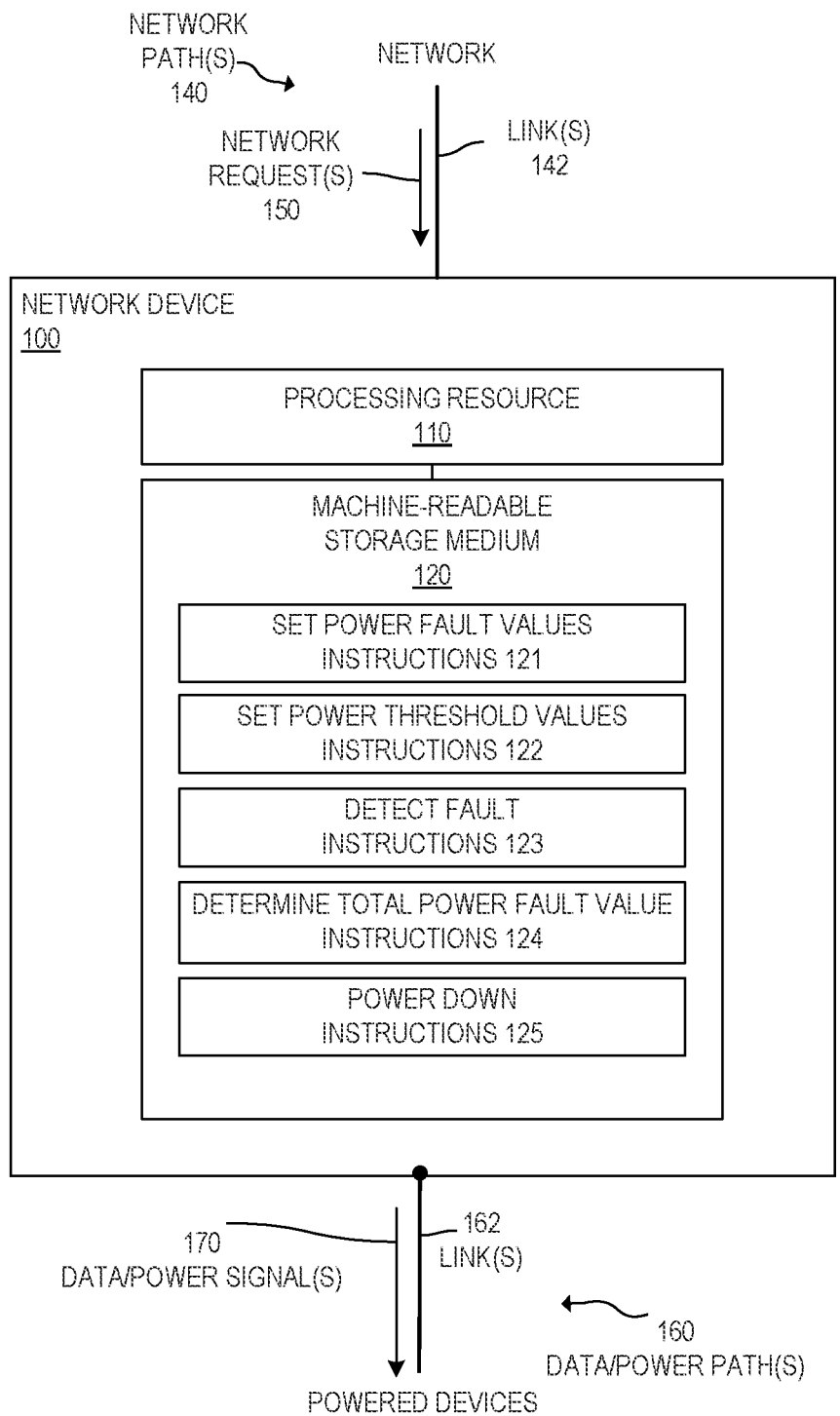
FIG. 1 is a block diagram of an example network device for power down of PoE interfaces.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

In industrial network deployments, such as enterprise networks, campus networks, or data center networks (DCNs), hundreds or thousands of devices may be connected to a network via network devices (e.g., Ethernet switches). While a single PD may consume a relatively small amount of power delivered via a PoE interface (e.g., Ethernet port), the PDs in the network may collectively consume an amount of power that is significant in terms of the cost and in terms of the percentage of overall power used by devices in the network. In some instances, the amount of power required for such PDs is far greater than the amount of power that is required for network devices to provide data networking functionality (e.g., switching, routing) to the network.

When a network device providing PoE power and data transmissions to PDs loses the power supplied by one or more power supply units (PSUs) through a PSU fault and/or power source outage (hereinafter generally referred to as a "power fault event"), there is a chance that the network will experience an abrupt downtime if the aggregate power load used by the PDs and the network device satisfies a total power output capacity of the remaining operational (i.e., non-faulted) PSUs. Such downtime can lead to the total loss of PoE power and data transmissions for certain types of PDs, which may prove costly for applications which require high reliability of PoE power and data transmissions.

To facilitate increased reliability of PoE power and data transmissions during a power fault event, a network device may be configured for PSU redundancy, to receive backup power from one or more independent PSUs which hold power in reserve for use during the power fault event. However, such PSU redundancy may force a strict trade-off between power redundancy and total power output capacity, since the total amount of usable power is reduced as more power output capacity is held in reserve as redundant power via the redundant PSUs. Moreover, such PSU redundancy may only protect up to a number of PSUs configured for redundancy and may not easily allow for PSUs of differing power output capacities to be used together to power a network device.

Moreover, a network device may be configured to use rapid power down (RPD), a technique to rapidly power down a predetermined number of PoE interfaces during a power fault event. Although such RPD techniques may allow continued operation of certain high priority PoE interfaces and data networking functions by the network device, such techniques may not support multi-fault conditions, i.e., when more than one PSU faults during a power fault event and/or when multiple power fault events occur. Moreover, when PSUs of different power output capacities power a network device, such RPD techniques may power down more PoE interfaces than necessary to avoid network downtime when a PSU which faults has a lower power output capacity than an operational (i.e., non-faulted) PSU. Furthermore, such RPD techniques may require software-based communication between PSU management and PoE management subsystems on failsafe power when a PSU fault occurs, which may result in more complicated development and verification testing and increased latency between the PSU management and PoE management subsystems.

Furthermore, network devices may be configured to support multi-priority rapid power down (MPRPD), a technique to rapidly power down a predetermined number of PoE interfaces based on the power output capacity of the PSU which faults. Although such MRPRD techniques may allow for easier use of PSUs of different power output capacities, they may have similar drawbacks as RPD techniques because they may not support multi-fault conditions. Moreover, such MPRPD techniques may also require software-based communication between PSU management and PoE management subsystems on failsafe power when a PSU fault occurs, which may result in more complicated development and verification testing and increased latency between the PSU management and PoE management subsystems.

To address these issues, examples described herein provide improved power down of PoE interfaces. Examples described herein may set a power fault value for each of a plurality of PSUs and set a power threshold value for each of a plurality of PoE interfaces. Examples described herein may detect a fault that interrupts a flow of power from a subset of the PSUs to at least one of the PoE interfaces, and based on detecting the fault, for each PSU in the subset of the PSUs, add the power fault value for the PSU to a total power fault value. Examples described herein may, for each of the PoE interfaces, determine whether the total power fault value satisfies the power threshold value for the PoE interface, and based on a determination that the total power fault value satisfies the power threshold value for the PoE interface, power down the PoE interface.

In this manner, examples described herein provide improved power down of PoE interfaces and more efficient power utilization of PSUs over existing techniques. For instance, in examples described herein, a network device may detect a fault that interrupts a flow of power from a subset of the PSUs to at least one of the PoE interfaces, and based on detecting the fault, for each PSU in the subset of the PSUs, add the power fault value for the PSU to a total power fault value, thereby providing an accurate and efficient determination of total loss of power due to PSU faults, even for multi-fault conditions. Moreover, in examples described herein, a network device may, for each of the PoE interfaces, determine whether the total power fault value satisfies the power threshold value for the PoE interface, and based on a determination that the total power fault value satisfies the power threshold value for the PoE interface, power down the PoE interface, thereby providing efficient power down of only a number of PoE interfaces that is necessary to prevent an aggregate power load from exceeding the capacity of the operational (i.e., non-faulted) PSUs. In addition, examples described herein may determine whether the total power fault value satisfies the power threshold value for the PoE interface and power down the PoE interface, without requiring software-based communication between PSU management and PoE management subsystems on failsafe power, thereby simplifying the power down process for PoE interfaces and reducing latency.

Referring now to the drawings, FIG. 1 is a block diagram of an example network device 100 for improved power down of PoE interfaces. Network device 100 includes at least one processing resource 110 and at least one machine-readable storage medium 120 comprising (e.g., encoded with) at least set power fault values instructions 121, set power threshold values instructions 122, detect fault instructions 123, determine total power fault value instructions 124, and power down instructions 125. Network device 100 may comprise one or more managed switches which support data link layer switching (i.e., Layer 2 or L2 switching), IP layer routing (i.e., Layer 3 or L3 routing), or a combination thereof. Moreover, network device 100 may comprise one or more stackable or standalone type switches, modular or fixed configuration type switches, etc. It will be understood that network device 100 may include one, two, or any suitable number of switches, and may include any suitable type(s) of switch(es), now known or later developed. In addition, network device 100 may engage in any network data transmission operations, including, but not limited to, switching, routing, bridging, or a combination thereof.

In the example of FIG. 1, network device 100 may operate as a PSE for one or more PDs. Network device 100 may be configured (e.g., encoded with instructions executable by at least one processing resource 110) to receive network request(s) 150 from a network via network path(s) 140 to establish or terminate PoE data and/or power transmissions with one or more PDs. Network path(s) 140 may include any suitable link(s) 142 (e.g., wired or wireless, direct or indirect, etc.) between network device 100 and a network. Network request(s) 150 may include any suitable instructions to instruct network device 100 to establish or terminate PoE data and/or power transmissions with one or more PDs. For instance, network request(s) 150 may include instructions to instruct network device 100 to perform set power fault values instructions 121, set power threshold values instructions 122, detect fault instructions 123, determine total power fault value instructions 124, and power down instructions 125.

In examples described herein, a "network path" may include a combination of hardware (e.g., interfaces, links, etc.) and instructions (e.g., executable by a processing resource) to communicate (e.g., receive, send) a command (e.g., network request 150) to an external resource (e.g., server, cloud computing resource, etc.) connected to the network.

In the example of FIG. 1, network device 100 may be connected to one or more networks and may gather network operating information from various nodes of the one or more networks, including network traffic load information, network topology information, network usage information, etc. Furthermore, network device 100 may transmit commands to various nodes of the one or more networks to alter network topology and routing to achieve various network efficiency and efficacy goals. It will be understood that network device 100 may comprise any suitable type(s) of computing device(s) to establish or terminate PoE data and/or power transmissions via one or more PoE interfaces. Moreover, network device 100 may include any necessary hardware components to perform the invention disclosed herein, including, but not limited to: processors, memories, display devices, input devices, communications equipment, etc.

In the example of FIG. 1, network device 100 may be coupled to a plurality of power supply units (PSUs) (not shown). Network device 100 may comprise a chassis which includes the PSUs. Moreover, the PSUs may be fixed in the chassis of network device 100, or alternatively, the PSUs may be removably attached in the chassis of network device 100. Two or more of the PSUs may have different power output capacities (e.g., one PSU may have a power output capacity of 3 kilowatts, and another PSU may have a power output capacity of 4 kilowatts). It will be understood that network device 100 may be coupled to two, four, or any suitable number of PSUs. Network device 100 may comprise one or more redundant PSUs, wherein the one or more redundant PSUs may provide backup power when one or more other PSUs of network device 100 experience a fault (e.g., from a power fault event). Each of the PSUs may receive input power from an input power source (e.g., a power distribution unit). Moreover, each of the PSUs may be configured to continue to provide rated power for a period of time after losing power from the input power source. For instance, each of the PSUs may be configured to provide rated power for at least a period of time necessary for processing resource 100 to perform one or more of detect fault instructions 123, determine total power fault value instructions 124, and power down instructions 125.

In the example of FIG. 1, network device 100 may be coupled to a plurality of PoE interfaces (not shown) and may operate as a PSE to provide PoE to one or more PDs coupled to the PoE interfaces. Each of the PoE interfaces may comprise an Ethernet port, wherein the Ethernet port may comprise any suitable physical interface circuitry and/or media dependent interface to provide PoE to a PD coupled to the Ethernet port. Network device 100 may comprise a chassis which includes the PoE interfaces in the chassis. Moreover, the PoE interfaces may be fixed in the chassis of network device 100, or alternatively, the PoE interfaces may be removably attached in the chassis of network device 100. The PoE interfaces may be coupled to one or more line cards, wherein the one or more line cards are coupled to network device 100. The one or more line cards may be fixed in the chassis of network device 100, or alternatively, the one or more line cards may be removably attached in the chassis of network device 100. It will be understood that network device 100 may be coupled to 240, 480, or any suitable number of PoE interfaces, and that network device 100 may be coupled to five, ten, or any suitable number of line cards that are each coupled to any suitable number of the PoE interfaces. It will be understood that network device 100 and the PoE interfaces may provide PoE data and/or power transmissions in conformity with any suitable type(s) of industry Ethernet standards, now known or later developed. For instance, network device 100 and the PoE interfaces may provide PoE data and/or power transmissions in conformity with one or more of IEEE 802.3af, IEEE 802.3at, IEEE 802.3bt, and LTPoE++.

In the example of FIG. 1, network device 100 may be configured (e.g., encoded with instructions executable by at least one processing resource 110) to send or receive data/power signal(s) 170 via data/power path(s) 160 to establish or terminate PoE data and/or power transmissions with one or more PDs. Data/power path(s) 160 may include any suitable link(s) 162 between network device 100 and one or more PDs. For instance, link(s) 162 may comprise one or more Ethernet cables. Data/power signal(s) 170 may include any suitable instructions for network device 100 to establish or terminate PoE data and/or power transmissions with one or more PDs (e.g., for network device 100 to perform set power fault values instructions 121, set power threshold values instructions 122, detect fault instructions 123, determine total power fault value instructions 124, and power down instructions 125).

In examples described herein, a "data/power path" may include a combination of hardware (e.g., interfaces, links, etc.) and instructions (e.g., executable by a processing resource) to communicate (e.g., receive, send) a command (e.g., data/power signal 170, data/power signal 290) with one or more PDs.

Figure 3:
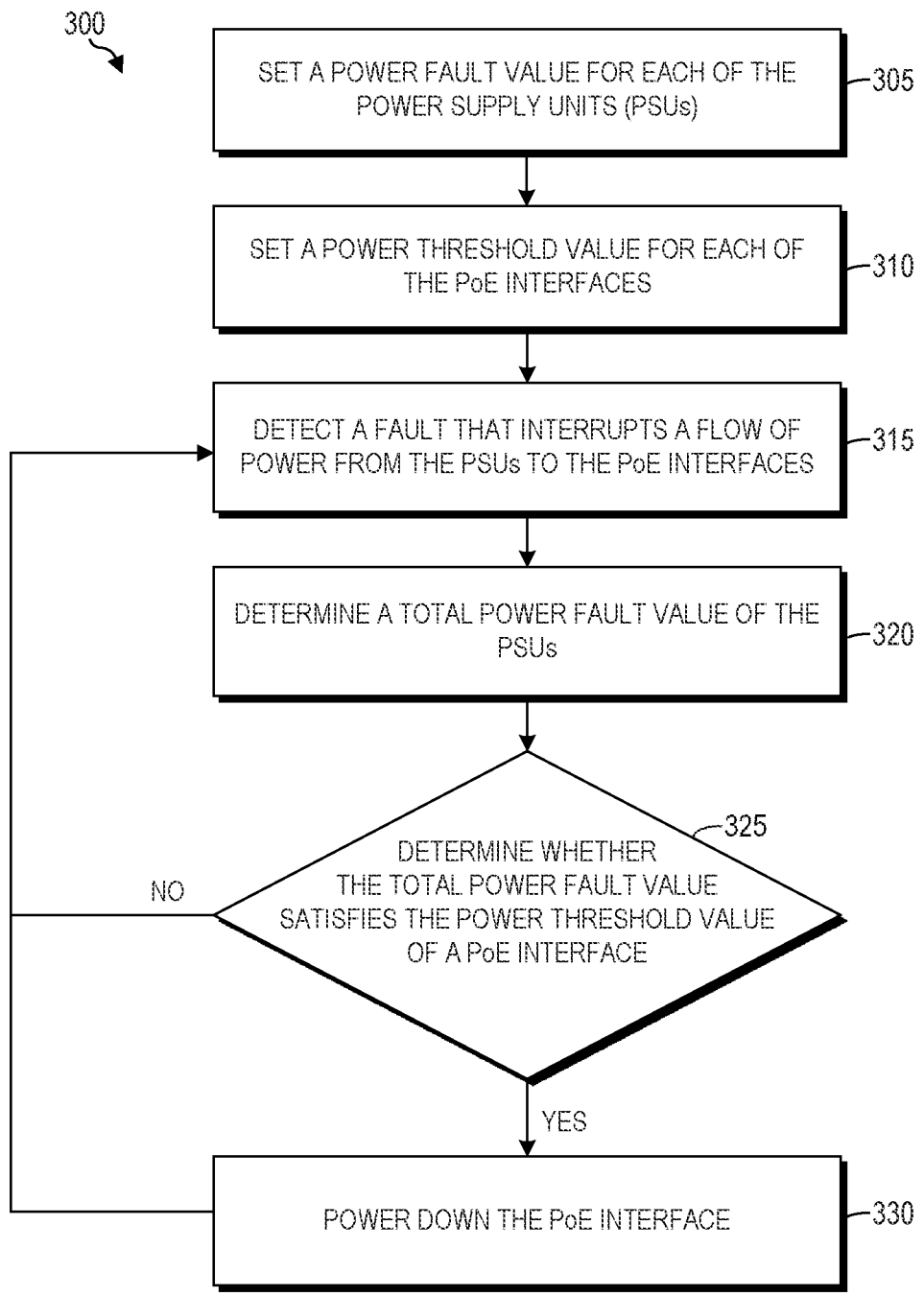
FIG. 3 is a flowchart of an example method for power down of PoE interfaces.

FIG. 3 is a flowchart of an example method 300 for power down of PoE interfaces. Although execution of method 300 is described below with reference to network device 100, any suitable PSE device(s) for the execution of method 300 may be utilized. Additionally, implementation of method 300 is not limited to such examples. While only six blocks are shown in method 300, method 300 may include other actions described herein. Additionally, although the blocks are shown in an order, blocks depicted in FIG. 3 may be performed in any suitable order and at any time. Also, some of the blocks shown in method 300 may be omitted without departing from the spirit and scope of this disclosure.

In the example of FIG. 3, at block 305, set power fault values instructions 121, when executed by processing resource 110, sets a power fault value for each of a plurality of PSUs. Setting the power fault value for each PSU may comprise assigning an unsigned bit value to the PSU. For instance, an 8-bit unsigned value between 0 and 255 may be assigned as the power fault value for the PSU. In addition, the power fault value for each PSU may correspond to a ratio between a power output capacity of the PSU and a total power output capacity of all the PSUs of network device 100. For instance, when network device 100 is coupled to two PSUs each having the same power output capacity (e.g., 4 kilowatts), each PSU may be assigned the 8-bit unsigned value of 127 as the power fault value, to represent that the power output capacity of the PSU is one half of the total power output capacity of both PSUs (represented as the 8-bit unsigned value of 255). Each bit of the power fault value may correspond to an amount of power that can be provided to one or more PoE interfaces by network device 100. For instance, when network device 100 receives power from PSUs having a total power output capacity of 12 kilowatts, and when the power fault value is represented as an 8-bit unsigned value, each bit of the power fault value may correspond to 46.875 watts of power that can be provided to one or more PoE interfaces by network device 100. It will be understood that the power fault value for each of the PSUs can be an 8-bit unsigned value, 9-bit unsigned value, 16-bit unsigned value, or any suitable size bit value, and may also include any suitable format(s) (e.g., unsigned bit value, signed bit value).

In the example of FIG. 3, at block 310, set power threshold values instructions 122, when executed by processing resource 110, sets a power threshold value for each of a plurality of PoE interfaces. The power threshold value for a PoE interface may represent a threshold amount of total power output capacity of all operational (i.e., non-faulted) PSUs of network device 100, which must be satisfied to configure network device 100 to provide power to the PoE interface. Alternatively, the power threshold value for a PoE interface may represent a threshold total power output capacity of all faulted PSUs of network device 100, which must be satisfied to configure network device 100 to stop providing power (i.e., to power down) the PoE interface. Setting the power threshold value for each PoE interface may comprise assigning an unsigned bit value for the PoE interface. For instance, an 8-bit unsigned bit value between 0 and 255 may be assigned as the power threshold value for the PoE interface. It will be understood that the power threshold value for each of the PoE interfaces can be an 8-bit unsigned value, 9-bit unsigned value, 16-bit unsigned value, or any suitable size bit value, and may also include any suitable format(s) (e.g., unsigned bit value, signed bit value). The power threshold value for a given PoE interface relative to the other PoE interfaces may be predetermined by network device 100 or received as an input by network device 100 (e.g., from one or more networks via network request 150).

For instance, at block 310, when the power threshold value for a PoE interface is an 8-bit unsigned bit value and represents a total power output capacity of all operational PSUs of network device 100, a power threshold value of 0 may correspond to the minimum total power output capacity of the PSUs (e.g., the power output capacity of the PSU among the PSUs having the smallest power output capacity, when all other PSUs are faulted), and a power threshold value of 255 may correspond to the maximum total power output capacity of the PSUs (e.g., the total power output capacity of the PSUs when none of the PSUs are faulted). In such example, a PoE interface that is assigned a power threshold value of 255 may be configured (e.g., by network device 100) to receive power as long as the amount of power received from the PSUs corresponds to the maximum total power output capacity of the PSUs. Alternatively, for instance, at block 310, when the power threshold value for a PoE interface is an 8-bit unsigned bit value and represents a total power output capacity of all faulted PSUs of network device 100, a power threshold value of 0 may correspond to the maximum power output capacity of the PSUs (e.g., the total power output capacity of the PSUs when none of the PSUs are faulted), and a power threshold value of 255 may correspond to the minimum total output capacity of the PSUs (e.g., the power output capacity of the PSU among the PSUs having the smallest power output capacity, when all other PSUs are faulted). In such example, a PoE interface that is assigned a power threshold value of 255 may be configured (e.g., by network device 100) to receive power as long as an amount of power received from the PSUs corresponds to the minimum total power output capacity of the PSUs.

In the example of FIG. 3, at block 310, the power threshold value for each PoE interface may correspond to a priority level for providing power to the PoE interface relative to the other PoE interfaces. The priority level for providing power to a given PoE interface relative to the other PoE interfaces may be predetermined by network device 100 or received as an input by network device 100 (e.g., from one or more networks via network request 150).

For instance, at block 310, when the power threshold value for a PoE interface is an 8-bit unsigned bit value and represents a threshold amount of total power output capacity of all operational PSUs of network device 100, and when a higher bit value corresponds to a higher threshold amount of total power output capacity of the operational PSUs, a PoE interface that is assigned a power threshold value of 127 may be configured to have a higher priority level for receiving power as compared to another PoE interface that is assigned the power threshold value of 255. Alternatively, for instance, at block 310, when the power threshold value for a PoE interface is an 8-bit unsigned bit value and represents a threshold amount of total power output capacity of all faulted PSUs of network device 100, and when a higher bit value corresponds to a higher threshold amount of total power output capacity of the faulted PSUs, a PoE interface that is assigned a power threshold value of 127 may be configured to have a lower priority level for receiving power as compared to another PoE interface that is assigned the power threshold value of 255.

In the example of FIG. 3, at block 315, detect fault instructions 123, when executed by processing resource 110, detects a fault (i.e., a power fault event) that interrupts a flow of power from a subset of the PSUs to at least one of the PoE interfaces. Detect fault instructions 123 may comprise instructions to determine, for each PSU among the PSUs, whether the PSU is faulted (and is thereby in the subset of PSUs that has faulted). Determining whether each PSU among the PSUs has faulted may be performed synchronously or asynchronously with the other PSUs. For instance, determining whether each PSU has faulted (and is thereby in the subset of PSUs) may be performed asynchronously (e.g., independently and in parallel and/or simultaneously) with the other PSUs. In addition, detect fault instructions 123 may comprise instructions to detect a subsequent fault (e.g., a second fault, a third fault, etc.) that interrupts the flow of power from a subset of PSUs to at least one of the PoE interfaces.

In the example of FIG. 3, at block 320, determine total power fault value instructions 124, when executed by processing resource 110, determines the total power fault value of the PSUs. At block 320, determine total power fault instructions 124 may comprise instructions to, based on (e.g., in response to) detecting the fault (or a subsequent fault), for each PSU in the subset of the PSUs, adds the power fault value for the PSU to a total power fault value. Adding the power fault value for the PSU to the total power fault value may be performed via an adder circuit. For instance, determine total power fault value instructions 124 may comprise instructions to receive, by an adder circuit, the power fault value for the PSU as an input value, and add, by the adder circuit, the power fault value for the PSU to the total power fault value. The adder circuit for computing the total power fault value for the PSUs may comprise multiple adders (e.g., multiple levels of adders). Adding the power fault value for each of the PSUs to the total power fault value may be performed synchronously or asynchronously with the other PSUs. For instance, the power fault value for each of the faulted PSUs can be added simultaneously to the total power fault value via the adder circuit. It will be understood that the adder circuit may comprise one, three, or any suitable number of adders, and that the adder circuit may comprise one or more half adders, full adders, ripple-carry adders, carry-lookahead adders, carry-save adders, or any suitable type(s) of adders. It will be understood that the adder circuit may be integrated in one or more devices (e.g., chips) as an integrated circuit and/or any other suitable hardware.

In the example of FIG. 3, at block 320, determine total power fault value instructions 124, when executed by processing resource 110, may send the total power fault value as an output value to each of the PoE interfaces. Sending the total power fault value as an output value to each of the PoE interfaces may be performed via an adder circuit (e.g., as described above in relation to block 320). Moreover, sending the total power fault value as an output value to each of the PoE interfaces may be performed synchronously or asynchronously with sending the output value to the other PoE interfaces. For instance, the total power value can be sent as an output value asynchronously (e.g., independently and in parallel and/or simultaneously) to each of the PoE interfaces.

In the example of FIG. 3, at block 325, power down instructions 125, when executed by processing resource 110, for each of the PoE interfaces, determines whether the total power fault value satisfies the power threshold value for the PoE interface. Determining whether the total power fault value satisfies the power threshold value for each PoE interface may be performed synchronously or asynchronously with the other PoE interfaces. For instance, determining whether the total fault value satisfies the power threshold value may be performed asynchronously (e.g., independently and in parallel and/or simultaneously) with each of the PoE interfaces. At block 325, if it is determined that the total power fault value satisfies the power threshold value, then method 325 proceeds to block 330. At block 325, if it is determined that the total power fault value does not satisfy the power threshold value, then method 300 may return to block 315.

In the example of FIG. 3, at block 325, when the power threshold value for each PoE interface represents a threshold amount of total power of all operational PSUs of network device 100, the total power fault value may satisfy the power threshold value for the PoE interface when a difference between a maximum total power output capacity value of the PSUs and the total power fault value is less than the power threshold value for the PoE interface. For instance, when the power threshold value for a PoE interface is represented as an 8-bit unsigned bit value (ranging from 0 to 255) and represents a threshold amount of total power of all operational PSUs of network device 100, and when the total power fault value is represented as an 8-bit unsigned value (ranging from 0 to 255), the total power fault value may satisfy the power threshold value for the PoE interface when a difference between a maximum total power output capacity value of the PSUs (i.e., assigned a value of 255) and the total power fault value is less than the power threshold value for the PoE interface. In such instance, when the power threshold value for a PoE interface is assigned a value of 127 and when the total fault value is assigned a value of 200, it may be determined that the total power fault value satisfies the power threshold value since a difference between a maximum total power output capacity value of the PSUs and the total power fault value (i.e., 255-200, or 55) is less than the power threshold value (i.e., 127) for the PoE interface. Moreover, in such instance, when the power threshold value for a PoE interface is assigned a value of 225 and when the total fault value is assigned a value of 125, it may be determined that the total power fault value does not satisfy the power threshold value since a difference between a maximum total power output capacity value of the PSUs and the total power fault value (i.e., 255-125, or 130) is not less than the power threshold value (i.e., 127) for the PoE interface.

In the example of FIG. 3, at block 325, when the power threshold value for each PoE interface represents a threshold amount of total power of all faulted PSUs of network device 100, the total power fault value may satisfy the power threshold value for the PoE interface when the total power fault value is greater than the power threshold value for the PoE interface. For instance, when the power threshold value for a PoE interface is represented as an 8-bit unsigned bit value (ranging from 0 to 255) and represents a threshold amount of total power of all faulted PSUs of network device 100, and when the total power fault value is represented as an 8-bit unsigned bit value (ranging from 0 to 255), the total power fault value may satisfy the power threshold value for the PoE interface when the total power fault value is greater than the power threshold value for the PoE interface. In such instance, when the power threshold value for a PoE interface is assigned a value of 125 and when the total fault value is assigned a value of 200, it may be determined that the total power fault value satisfies the power threshold value since the total power fault value (i.e., 200) is greater than the power threshold value (i.e., 125) for the PoE interface. Moreover, in such instance, when the power threshold value for a PoE interface is assigned a value of 225 and when the total fault value is assigned a value of 200, it may be determined that the total power fault value does not satisfy the power threshold value since the total power fault value (i.e., 200) is not greater than the power threshold value (i.e., 225) for the PoE interface.

In the example of FIG. 3, at block 330, power down instructions 125, when executed by processing resource 110, powers down the PoE interface. Each PoE interface, for which it is determined (at block 325) that the total power fault value satisfies the power threshold value for the PoE interface, may be powered down synchronously or asynchronously with one or more of the other PoE interfaces for which is/are determined (at block 325) that the total power fault value satisfies the corresponding power threshold value for the PoE interface(s). For instance, each PoE interface for which it is determined that the total power fault value satisfies the power threshold value for the PoE interface may be powered down asynchronously (e.g., independently and in parallel and/or simultaneously) with all other such PoE interfaces. Determining whether the total power fault value satisfies the power threshold value for a given PoE interface may be performed via a comparator circuit. For instance, power down instructions 125 may comprise instructions to receive, by a comparator circuit, the total power fault value as a first input value, receive the power threshold value for the PoE interface as a second input value, and compare the total power fault value with the power threshold value for the PoE interface. Moreover, power down instructions 125 may comprise instructions to send, by the comparator circuit, an output value that indicates whether the total power fault value satisfies the power threshold value for the PoE interface. For instance, the comparator circuit may send a high output voltage value to indicate that the total power value satisfies the power threshold value for the PoE interface, or alternatively, the comparator circuit may send a low output voltage value to indicate that the total power value satisfies the power threshold value for the PoE interface. The comparator circuit may receive the total power fault value from an adder circuit (as described above). For instance, each PoE interface may comprise a separate comparator circuit that determines whether the total power fault value for the PoE interface satisfies the power threshold value for the PoE interface. It will be understood that the comparator circuit may be integrated in one or more devices (e.g., chips) as an integrated circuit and/or any other suitable hardware.

In the example of FIG. 3, at blocks 325 and 330, power down instructions 125 (as described above) may be implemented using hardware (e.g., a comparator circuit) at each PoE interface, such that software-based communication between PSU management and PoE management subsystems on failsafe power is not required to power down the PoE interface.

In the example of FIG. 3, method 300 may return to block 315 after powering down of one or more of the PoE interfaces at block 330. For instance, when a subsequent fault (i.e., subsequent power fault event) occurs in which a second PSU faults after a period of time after a first PSU faults, method 300 may power down one or more of the PoE interfaces to account for the first PSU fault, and then power down one or more of the PoE interfaces to account for the second PSU fault. For example, at block 315, detect fault instructions 123, when executed by processing resource 110, may detect a second fault that interrupts a flow of power from a second subset of the PSUs to at least one of the PoE interfaces, wherein the second fault occurs a period of time after the fault (i.e., first fault) occurs. In such example, the subset of the PSUs (i.e., the first subset of the PSUs) includes the first PSU, and the second subset of the PSUs includes the second PSU. In addition, at block 320, determine total power fault value instructions 124, when executed by processing resource 110, may, based on detecting the second fault, for each PSU in the second subset of the PSUs, add the power fault value for the PSU to a second total power fault value, and send the total power fault value as an output value to each of the PoE interfaces. Furthermore, at block 325, power down instructions 125, when executed by processing resource 110, may, for each of the PoE interfaces, determine whether the second total power fault value satisfies the power threshold value for the PoE interface. Moreover, at block 330, power down instructions 125, when executed by processing resource 110, may, based on a determination that the second total power fault value satisfies the power threshold value for the PoE interface, power down the PoE interface. It will be understood that method 300 may return to block 315 after powering down one or more PoE interfaces at block 330 to account for any subsequent faults (e.g., third fault, fourth fault, etc.)

In this manner, example network device 100 of FIG. 1 (and example method 300 of FIG. 3) provides improved power down of PoE interfaces. For instance, network device 100 may detect a fault that interrupts a flow of power from a subset of the PSUs to at least one of the PoE interfaces (at block 315), and based on detecting the fault, for each PSU in the subset of the PSUs, add the power fault value for the PSU to a total power fault value (at block 320), thereby providing an accurate and efficient determination of total loss of power due to PSU faults, even for multi-fault conditions. Furthermore, network device 100 may, for each of the PoE interfaces, determine whether the total power fault value satisfies the power threshold value for the PoE interface (at block 325), and based on a determination that the total power fault value satisfies the power threshold value for the PoE interface, power down the PoE interface (at block 330), thereby providing efficient power down of only a number of PoE interfaces that is necessary to prevent an aggregate power load (e.g., a total power load of the PDs and network device 100) from exceeding the capacity of the operational (i.e., non-faulted) PSU(s). In addition, network device 100 may comprise hardware that is configured to determine whether the total power fault value satisfies the power threshold value for the PoE interface (at block 325) and power down the PoE interface (at block 330), thus mitigating the need for software-based communications between PSU management and PoE management subsystems on failsafe power to power down PoE interfaces and thereby reducing latency.

Figure 2:
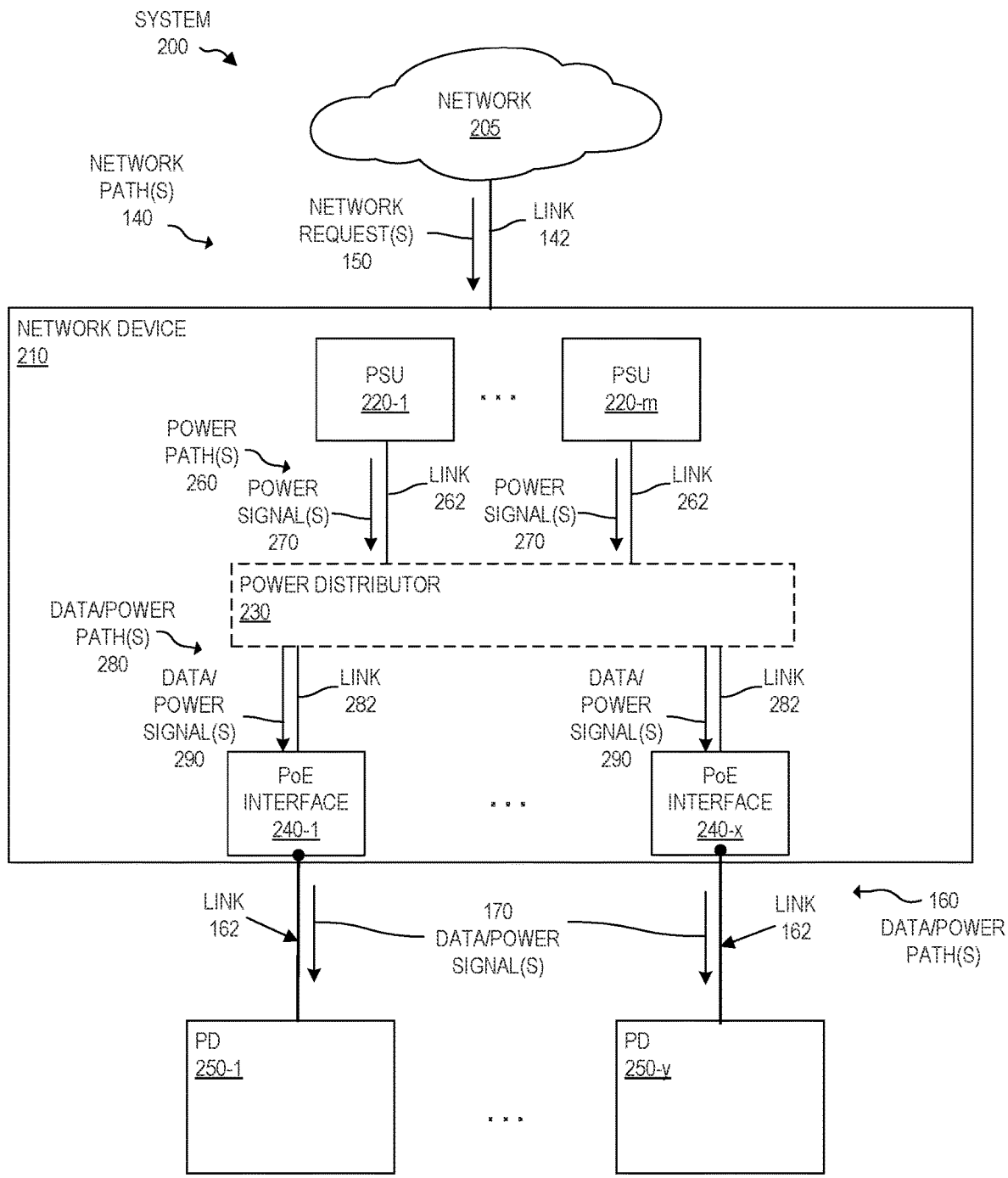
FIG. 2 is a block diagram of an example system for power down of PoE interfaces.

FIG. 2 is a block diagram of an example system 200 for power down of PoE interfaces. System 200 includes network device 210. In addition, system 200 comprises a network 205 and a plurality of PDs 250-1 to 250-$y$ that are coupled to network device 210, wherein y is an integer and represents a total number of PDs that are coupled to network device 210.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, in some examples, network 205 may comprise one or more cellular networks using one or more mobile communications standards (e.g., 4G, 5G, etc.). It will be understood that system 200 may comprise any suitable type(s) of network(s) 205. Moreover, although FIG. 2 shows that a single network device 210 is connected to network 205, it will be understood that any suitable number(s) of network devices (in addition to network device 210) may be connected to network 205.

In the example of FIG. 2, network device 210 may comprise the same and/or similar features and perform the same and/or similar functions as network device 100, as described above in relation to FIG. 1. Network device 210 may include at least one processing resource 110 (not shown) and at least one machine-readable storage medium 120 (not shown) comprising (e.g., encoded with) at least set power fault values instructions 121, set power threshold values instructions 122, detect fault instructions 123, determine total power fault value instructions 124, and power down instructions 125, as described above in relation to FIG. 1. Moreover, network device 210 may be configured (e.g., encoded with instructions executable by at least one processing resource 110) to receive network request(s) 150 from network 205 via network path(s) 140 to establish or terminate PoE data and/or power transmissions with one or more of PDs 250-1 to 250-$y$, as described above in relation to FIG. 1. Furthermore, network device 210 may be configured (e.g., encoded with instructions executable by at least one processing resource 110) to send or receive data/ power signal(s) 170 via data/power path(s) 160 to establish or terminate PoE data and/or power transmissions with one or more of PDs 250-1 to 250-$y$, as described above in relation to FIG. 1.

In the example of FIG. 2, network device 210 may comprise a plurality of PSUs 220-1 to 220-$m$, wherein m is an integer and represents a total number of PSUs of network device 210. It will be understood that PSUs 220-1 to 220-$m$ may include any suitable type(s) of PSU, for example, as described above in relation to FIG. 1 above. Moreover, it will be understood that network device 210 may comprise two, four, or any suitable number m of PSUs 220-1 to 220-$m$.

In the example of FIG. 2, network device 210 may comprise a plurality of PoE interfaces 240-1 to 240-$x$, wherein x is an integer and represents a total number of PoE interfaces of network device 210. Each of PoE interfaces 240-1 to 240-$x$ may comprise an Ethernet port, wherein the Ethernet port may comprise any suitable physical interface circuitry and/or media dependent interface to provide PoE to a PD coupled to the Ethernet port. Network device 210 may comprise one or more line cards (not shown), wherein one or more of PoE interfaces 240-1 to 240-$x$ are coupled to the one or more line cards. It will be understood that network device 210 may be coupled to any suitable number x of PoE interfaces 240-1 to 240-$x$, and that network device 210 may be coupled any suitable number of line cards that are each coupled to any suitable number of PoE interfaces 240-1 to 240-$x$. It will be understood that network device 210 and PoE interfaces 240-1 to 240-$x$ may provide PoE data and power transmissions in conformity with any suitable type(s) of industry Ethernet standards (e.g., as described above in relation to FIG. 1).

In the example of FIG. 2, network device 210 may comprise a power distributor 230 which is coupled between PSUs 220-1 to 220-m and PoE interfaces 240-1 to 240-x, to provide power from PSUs 220-1 to 220-m to PoE interfaces 240-1 to 240-x. Power distributor 230 may be configured (e.g., encoded with instructions executable by at least one processing resource 110) to receive power signal(s) 270 from one or more PSUs 220-1 to 220-m via power path(s) 260. Power path(s) 260 may include any suitable link(s) 262 between PSUs 220-1 to 220-m and power distributor 230. Moreover, power distributor 230 may be configured (e.g., encoded with instructions executable by at least one processing resource 110) to send or receive data/power signal(s) 290 from power distributor 230 to one or more PoE interfaces 240-1 to 240-x via data/power path(s) 280. Data/power path(s) 280 may include any suitable link(s) 282 between power distributor 230 and PoE interfaces 240-1 to 240-x. Power distributor 230 may comprise a midplane which is configured to provide power to one or more of components (e.g., fabric(s), backplane(s), line card(s), management module(s), display card(s), etc.) of network device 210. Power distributor 230 may comprise one or more power boards which couple(s) one or more PSUs 220-1 to 220-m to a backplane of network device 210, to provide power to one or more components of network device 210. Alternatively, network device 210 may provide power from PSUs 220-1 to 220-m to PoE interfaces 240-1 to 240-x without a power distributor 230 coupled between PSUs 220-1 to 220-m and PoE interfaces 240-1 to 240-x.

In examples described herein, a "power path" may include a combination of hardware (e.g., interfaces, links, etc.) and instructions (e.g., executable by a processing resource) to communicate (e.g., receive, send) a command (e.g., power signal 270) with one or more components of network device 210.

In the example of FIG. 2, PDs 250-1 to 250-y may comprise any suitable type(s) of devices that may receive PoE from network device 210. For instance, PDs 250-1 to 250-y may include one or more VoIP phones, LED lights, IP cameras, wireless APs, or BLE beacons, or a combination thereof. It will be understood that system 200 may comprise two, fifty, one hundred, or any suitable number y of PDs 250-1 to 250-y. Moreover, it will be understood that PDs 250-1 to 250-y may receive PoE data and power transmissions in conformity with any suitable type(s) of industry Ethernet standards (e.g., as described above in relation to FIG. 1).

Example system 200 of FIG. 2 (and example method 300 of FIG. 3) provides improved power down of PoE interfaces by network device 210. For instance, network device 210 may detect a fault that interrupts a flow of power from a subset of PSUs 220-1 to 220-m to at least one of PoE interfaces 240-1 to 240-x (at block 315), and based on detecting the fault, for each PSU in the subset of the PSUs, add the power fault value for the PSU to a total power fault value (at block 320), thereby providing an accurate and efficient determination of total loss of power due to PSU faults in network 205, even for multi-fault conditions. Furthermore, network device 210 may, for each of PoE interfaces 240-1 to 240-x, determine whether the total power fault value satisfies the power threshold value for the PoE interface (at block 325), and based on a determination that the total power fault value satisfies the power threshold value for the PoE interface, power down the PoE interface (at block 330), thereby providing efficient power down of only a number of PoE interfaces 240-1 to 240-x that is necessary to prevent an aggregate power load from exceeding the power output capacity of the operational (i.e., non-faulted) PSU(s) among PSUs 220-1 to 220-m. In addition, network device 210 may comprise hardware that is configured to determine whether the total power fault value satisfies the power threshold value for the PoE interface (at block 325) and power down the PoE interface (at block 330), thus mitigating the need for software-based communications between PSU management and PoE management subsystems on failsafe power to power down one or more of PoE interfaces 240-1 to 240-x and thereby reducing latency.

Figure 4:
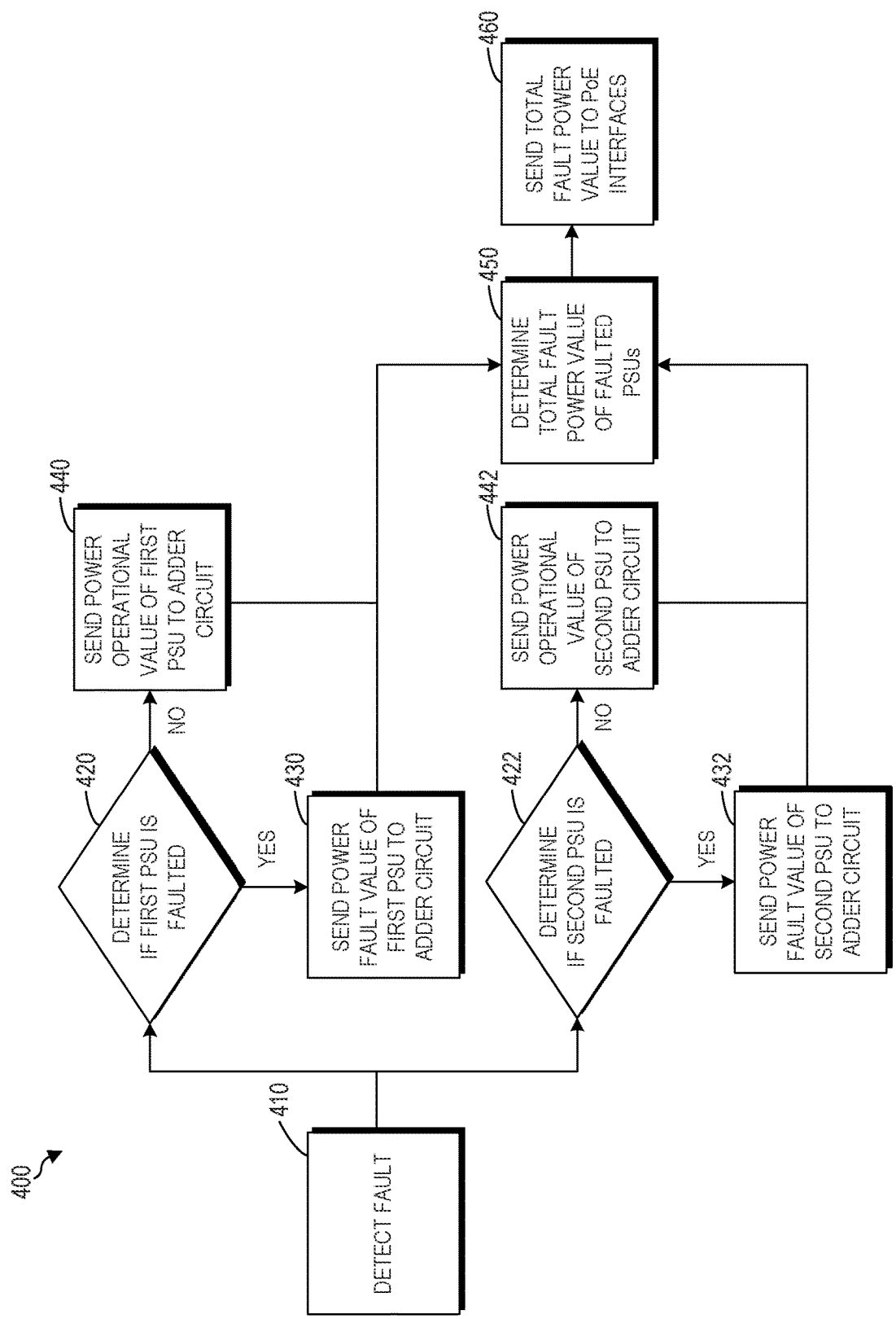
FIG. 4 is a flowchart of an example method for providing a total power fault value for a plurality of PSUs to each of a plurality of PoE interfaces.

FIG. 4 is a flowchart of an example method 400 for providing a total power fault value for a plurality of PSUs to each of a plurality of PoE interfaces by a network device (e.g., network device 100, network device 210). Although execution of method 400 is described below with reference to network device 100 and/or network device 210 of system 200, other network devices suitable for the execution of method 400 may be utilized. Additionally, implementation of method 400 is not limited to such examples. Moreover, one or more of blocks of method 400 may be performed in combination with one or more blocks of method 300. While only nine blocks are shown in method 400, method 400 may include other actions described herein. Additionally, although the blocks are shown in an order, blocks depicted in FIG. 4 may be performed in any suitable order and at any time. Also, some of the blocks shown in method 400 may be omitted without departing from the spirit and scope of this disclosure.

Referring to FIG. 4, at block 410, detect fault instructions 123, when executed by processing resource 110, detects a fault that interrupts a flow of power from one or more PSUs (e.g., a subset of PSUs among PSUs 220-1 to 220-m) to one or more PoE interfaces (e.g., one or more of PoE interfaces 240-1 to 240-x). Block 405 may include one or more steps of block 315 as described above in relation to method 300 of FIG. 3.

In the example of FIG. 4, at block 420, detect fault instructions 123, when executed by processing resource 110, determines whether a PSU (i.e., a first PSU) among the one or more PSUs has faulted (i.e., whether the first PSU is in the subset of PSUs that has faulted). Moreover, at block 422, detect fault instructions 123, when executed by processing resource 110, determines whether another PSU (i.e., a second PSU) among the one or more PSUs has faulted. A PSU (e.g., first PSU, second PSU, etc.) is determined to have faulted when the output power of the PSU is zero (e.g., a complete power fault) or less than a predetermined output power output capacity of the PSU (e.g., a partial power fault). Block 420 may include one or more steps of block 315 as described above in relation to method 300 of FIG. 3. Moreover, it will be understood that method 400 may include additional steps to determine whether one or more other PSUs (e.g., third PSU, fourth PSU, etc.) among the PSUs 220-1 to 220-m has/have faulted. Determining whether each PSU among PSUs 220-1 to 220-m has faulted may be performed synchronously or asynchronously with the other PSUs. For instance, determining whether the first PSU has faulted (at block 420) may be performed asynchronously (e.g., independently and in parallel and/or simultaneously) with determining whether the second PSU has faulted (at block 422).

At block 420, if it is determined that the first PSU has faulted, then method 400 proceeds to block 430. At block 420, if it is determined that the first PSU has not faulted, then method 400 proceeds to block 440. Similarly, at block 422, if it is determined that the second PSU has faulted, then method 400 proceeds to block 432. At block 422, if it is determined that the second PSU has not faulted, then method 400 proceeds to block 442.

In the example of FIG. 4, at block 430, detect fault instructions 123, when executed by processing resource 110, sends a power fault value for the first PSU to an adder circuit. Similarly, at block 432, detect fault instructions 123, when executed by processing resource 110, sends a power fault value for the second PSU to the adder circuit. Sending a power fault value for each PSU to the adder circuit may include one or more steps of block 320 as described above in relation to method 300 of FIG. 3. Moreover, a power fault value for a PSU may correspond to a ratio between a power output capacity of the PSU and a total power output capacity of all the PSUs (as described above in relation to block 305 of FIG. 3), such that the power fault value for the PSU indicates the amount of power output capacity which is lost when the PSU faults. Alternatively, a power fault value for a PSU may correspond to a null power value (e.g., an unsigned 8-bit value of 0), such that the power fault value represents that the PSU has no power output capacity when it is faulted.

In the example of FIG. 4, at block 440, detect fault instructions 123, when executed by processing resource 110, sends a power operational value for the first PSU to an adder circuit. Similarly, at block 442, detect fault instructions 123, when executed by processing resource 110, sends a power operational value for the second PSU to the adder circuit. A power operational value for a PSU may correspond to a ratio between a power output capacity of the PSU and a total power output capacity of all PSUs 220-1 to 220-m, such that the power operational value for the PSU represents the amount of power output capacity of the PSU. Alternatively, a power operational value for a PSU may correspond to a null power value (e.g., an unsigned 8-bit value of 0), such that the power operational value for the PSU represents that the PSU does not have a loss of power output capacity, i.e., the PSU is operational.

In the example of FIG. 4, sending the power fault value or power operational value for each PSU among PSUs 220-1 to 220-m to the adder circuit may be performed synchronously or asynchronously with sending the power fault value or power operational value for one or more of the other PSUs among PSUs 220-1 to 220-m. For instance, sending the power fault value for the first PSU to the adder circuit (at block 430) may be performed asynchronously (e.g., independently and in parallel and/or simultaneously) with sending the power fault value for the second PSU to the adder circuit (at block 432). Alternatively, for instance, sending the power operational value for the first PSU to the adder circuit (at block 440) may be performed asynchronously with sending the power operational value for the second PSU to the adder circuit (at block 442). Alternatively, for instance, sending the power fault value for the first PSU to the adder circuit (at block 430) may be performed asynchronously with sending the power operational value for the second PSU to the adder circuit (at block 442).

In the example of FIG. 4, at block 450, determine total power fault value instructions 124, when executed by processing resource 110, determines the total power fault value for the faulted PSUs among PSUs 220-1 to 220-m. The total power fault value for the faulted PSUs among PSUs 220-1 to 220-m may include one or more steps of block 320 as described above in relation to method 300 of FIG. 3. For instance, at block 450, determine total power fault instructions 124 may include instructions to add, by the adder circuit, the power fault value for each of the faulted PSUs (e.g., first PSU, second PSU, etc.).

In the example of FIG. 4, at block 460, determine total power fault instructions 124, when executed by processing resource 110, sends the total power fault value to each of PoE interfaces 240-1 to 240-x. Sending the total power fault value as an output value to each of PoE interfaces 240-1 to 240-x may include one or more steps of block 320 as described above in relation to method 300 of FIG. 3. For instance, sending the total power fault value as an output value to each of PoE interfaces 240-1 to 240-x may be performed via the adder circuit. Moreover, sending the total power fault value as an output value to each of the PoE interfaces may be performed synchronously or asynchronously with sending the output value to the other PoE interfaces among PoE interfaces 240-1 to 240-x. For instance, the total power fault value can be sent as an output value asynchronously (e.g., independently and in parallel and/or simultaneously) to each of PoE interfaces 240-1 to 240-x.

In this manner, example network device 100 of FIG. 1 (or network device 210 of FIG. 2) and example method 400 of FIG. 4 provides the total power fault value to each of PoE interfaces 240-1 to 240-x for improved power down of PoE interfaces. For instance, network device 100 (or network device 210) may detect a fault that interrupts a flow of power from a subset of PSUs 220-1 to 220-m to at least one of PoE interfaces 240-1 to 240-x (at blocks 410, 420, and 422), and based on detecting the fault, for each PSU in the subset of PSUs 220-1 to 220-m, add the power fault value for the PSU to a total power fault value (at blocks 430, 440, 432, 442, and/or 450), thereby providing an accurate and efficient determination of total loss of power due to PSU faults, even for multi-fault conditions. Furthermore, network device 100 (or network device 210) may, for each of PoE interfaces 240-1 to 240-x, send the total power fault value to each of PoE interfaces 240-1 to 240-x (at block 460), thus providing the total power fault value for PSUs 220-1 to 220-m to each of PoE interfaces 240-1 to 240-x and thereby allowing improved power down of one or more of 240-1 to 240-x (e.g., according to blocks 325 and 330 of method 300).

Figure 5:
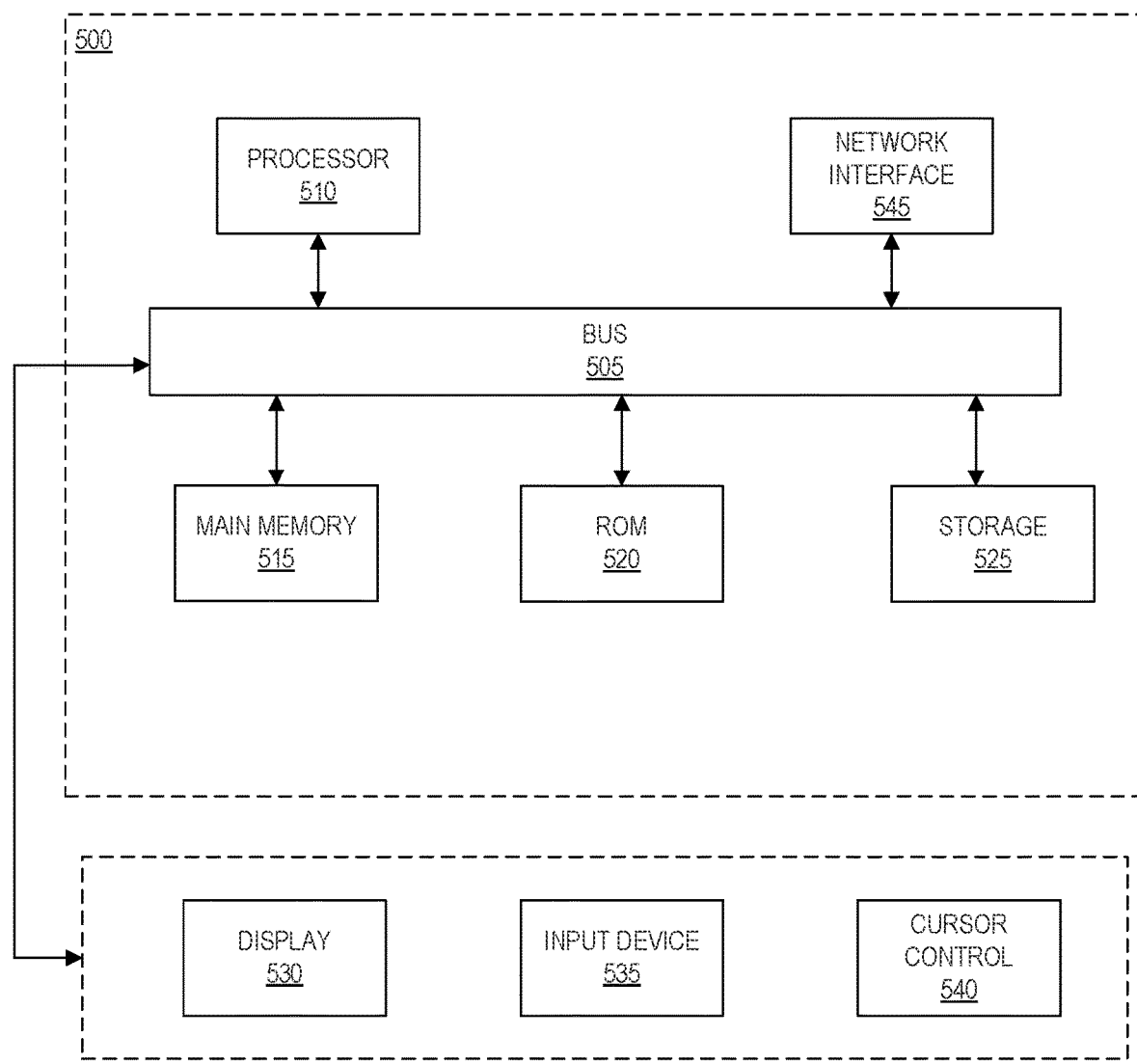
FIG. 5 is a block diagram of an example computer system in which various embodiments described herein may be implemented for providing power down of PoE interfaces.

FIG. 5 is a block diagram of an example computer system 500 in which various embodiments described herein may be implemented for power down of PoE interfaces.

Computer system 500 includes bus 505 or other communication mechanism for communicating information, at least one hardware processor 510 coupled with bus 505 for processing information. At least one hardware processor 510 may be, for example, at least one general purpose microprocessor.

Computer system 500 also includes main memory 515, such as random access memory (RAM), cache, other dynamic storage devices, or the like, or a combination thereof, coupled to bus 505 for storing information and one or more instructions to be executed by at least one processor 510. Main memory 515 also may be used for storing temporary variables or other intermediate information during execution of one or more instructions to be executed by at least one processor 510. In some examples, the one or more instructions comprise one or more of set power fault values instructions 121, set power threshold values instructions 122, detect fault instructions 123, determine total power fault value instructions 124, and power down instructions 125, as described above in relation to FIGS. 1-4. Such one or more instructions, when stored on storage media accessible to at least one processor 510, render computer system 500 into a special-purpose machine that is customized to perform the operations specified in the one or more instructions.

Computer system 500 may further include read only memory (ROM) 520 or other static storage device coupled to bus 505 for storing one or more instructions to be executed by at least one processor 510. In some examples, the one or more instructions comprise one or more of set power fault values instructions 121, set power threshold values instructions 122, detect fault instructions 123, determine total power fault value instructions 124, and power down instructions 125, as described above in relation to FIGS. 1-4. Such one or more instructions, when stored on storage media accessible to at least one processor 510, render computer system 500 into a special-purpose machine that is customized to perform the operations specified in the one or more instructions.

Computer system 500 may further include information and one or more instructions for at least one processor 510. At least one storage device 525, such as a magnetic disk, optical disk, or USB thumb drive (Flash drive), or the like, or a combination thereof, may be provided and coupled to bus 505 for storing information and one or more instructions. In some examples, the one or more instructions comprise one or more of set power fault values instructions 121, set power threshold values instructions 122, detect fault instructions 123, determine total power fault value instructions 124, and power down instructions 125, as described above in relation to FIGS. 1-4.

Computer system 500 may further include display 530 coupled to bus 505 for displaying a graphical output to a user. The computer system 500 may further include input device 535, such as a keyboard, camera, microphone, or the like, or a combination thereof, coupled to bus 505 for providing an input from a user. Computer system 500 may further include cursor control 540, such as a mouse, pointer, stylus, or the like, or a combination thereof, coupled to bus 505 for providing an input from a user.

Computer system 500 may further includes at least one network interface 545, such as a network interface controller (NIC), network adapter, or the like, or a combination thereof, coupled to bus 505 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 based on (e.g., in response to) at least one processor 510 executing one or more sequences of one or more instructions contained in main memory 515. Such one or more instructions may be read into main memory 515 from another storage medium, such as at least one storage device 525. Execution of the sequences of one or more instructions contained in main memory 515 causes at least one processor 510 to perform the process steps described herein. In alternative embodiments, hard-wired circuitry may be used in place of or in combination with software instructions.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
   setting a power fault value for each of a plurality of Power Supply Units (PSUs), wherein the power fault value for each PSU corresponds to a ratio between a power output capacity of the PSU and a total power output capacity of the plurality of PSUs;

setting a power threshold value for each of a plurality of Power over Ethernet (PoE) interfaces;
detecting a fault that interrupts a flow of power from a subset of the PSUs to at least one of the PoE interfaces;
based on detecting the fault, for each PSU in the subset of the PSUs, adding the power fault value for the PSU to a total power fault value; and
for each of the PoE interfaces:
  determining whether the total power fault value satisfies the power threshold value for the PoE interface; and
  based on a determination that the total power fault value satisfies the power threshold value for the PoE interface, powering down the PoE interface.

2. The method of claim 1, wherein the PSUs are configured to provide power to the PoE interfaces via a Power Sourcing Equipment (PSE).

3. The method of claim 1, wherein each of the PoE interfaces is coupled to a Powered Device (PD) via an Ethernet connection.

4. The method of claim 1, wherein setting the power fault value for each PSU comprises assigning an unsigned bit value to the PSU.

5. The method of claim 4, wherein the unsigned bit value is one of an 8-bit unsigned value, a 9-bit unsigned value, or a 16-bit unsigned value.

6. The method of claim 1, wherein setting the power threshold value for each PoE interface comprises assigning an unsigned bit value to the PoE interface.

7. The method of claim 1, wherein the power threshold value for each PoE interface corresponds to a priority level for providing power to the PoE interface relative to the other PoE interfaces.

8. The method of claim 1, wherein at least two of the PSUs have different power output capacities.

9. The method of claim 1, wherein, for each PSU in the subset of the PSUs, adding the power fault value for the PSU to the total power fault value comprises:
  receiving, by an adder circuit, the power fault value for the PSU; and
  adding, by the adder circuit, the power fault value for the PSU to the total power fault value.

10. The method of claim 9, comprising:
  sending, by the adder circuit, the total power fault value to each of the PoE interfaces.

11. The method of claim 1, wherein for each of the PoE interfaces, determining whether the total power fault value satisfies the power threshold value for the PoE interface comprises:
  receiving, by a comparator circuit, the total power fault value;
  receiving, by the comparator circuit, the power threshold value for the PoE interface;
  comparing, by the comparator circuit, the total power fault value with the power threshold value for the PoE interface to determine whether the total power fault value satisfies the power threshold value for the PoE interface.

12. The method of claim 1, comprising:
  detecting a second fault that interrupts a flow of power from a second subset of the PSUs to at least one of the PoE interfaces;
  based on detecting the second fault, for each PSU in the second subset of the PSUs, adding the power fault value for the PSU to a second total power fault value; and
  for each of the PoE interfaces:
    determining whether the second total power fault value satisfies the power threshold value for the PoE interface; and
    based on a determination that the second total power fault value satisfies the power threshold value for the PoE interface, powering down the PoE interface.

13. The method of claim 12, wherein the subset of the PSUs includes a first PSU among the PSUs, and wherein the second subset of the PSUs includes a second PSU among the PSUs.

14. The method of claim 12, wherein the second fault occurs a period of time after the fault occurs.

15. A network device, comprising:
  a plurality of Power Supply Units (PSUs);
  a plurality of Power over Ethernet (PoE) interfaces;
  at least one processing resource; and
  at least one machine-readable storage medium comprising instructions executable by the at least one processing resource to:
  set a power fault value for each of the PSUs, wherein the power fault value of each PSU corresponds to a ratio between a power output capacity of the PSU and a total power output capacity of the plurality of PSUs;
  set a power threshold value for each of the PoE interfaces;
  detect a fault that interrupts a flow of power from a subset of the PSUs to at least one of the PoE interfaces;
  based on detecting the fault, for each PSU in the subset of the PSUs, add the power fault value for the PSU to a total power fault value; and
  for each of the PoE interfaces:
    determine whether the total power fault value satisfies the power threshold value for the PoE interface; and
    based on a determination that the total power fault value satisfies the power threshold value for the PoE interface, power down the PoE interface.

16. The network device of claim 15, comprising:
  a power distributor, wherein the PSUs are configured to provide power to the PoE interfaces via the power distributor.

17. The network device of claim 15, wherein the power distributor comprises a midplane, a backplane, a power board, or a combination thereof.

18. The network device of claim 15, wherein each of the PoE interfaces is coupled to a Powered Device (PD) via an Ethernet connection.

19. An article comprising at least one non-transitory machine-readable storage medium comprising instructions executable by at least one processing resource to:
  set a power fault value for each of a plurality of Power Supply Units (PSUs), wherein the power fault value of each PSU corresponds to a ratio between a power output capacity of the PSU and a total power output capacity of the plurality of PSUs;
  set a power threshold value for each of a plurality of Power over Ethernet (PoE) interfaces;
  detect a fault that interrupts a flow of power from a subset of the PSUs to at least one of the PoE interfaces;
  based on detecting the fault, for each PSU in the subset of the PSUs, add the power fault value for the PSU to a total power fault value; and
  for each of the PoE interfaces:
    determine whether the total power fault value satisfies the power threshold value for the PoE interface; and based on a determination that the total power fault value satisfies the power threshold value for the PoE interface, power down the PoE interface.

20. The article of claim 19, wherein the instructions comprise instructions to:
- detect a second fault that interrupts a flow of power from a second subset of the PSUs to at least one of the PoE interfaces;
- based on detecting the second fault, for each PSU in the second subset of the PSUs, add the power fault value for the PSU to a second total power fault value; and
- for each of the PoE interfaces:
  - determine whether the second total power fault value satisfies the power threshold value for the PoE interface; and
  - based on a determination that the second total power fault value satisfies the power threshold value for the PoE interface, power down the PoE interface;
- wherein the second fault occurs a period of time after the fault occurs.

* * * * *